(12) United States Patent
Clark

(10) Patent No.: US 12,546,641 B2
(45) Date of Patent: Feb. 10, 2026

(54) HYGIENIC GUIDED WAVE LEVEL MEASUREMENT WITH SHEATH

(71) Applicant: Rosemount Inc., Shakopee, MN (US)

(72) Inventor: Jared A. Clark, Harmony, NC (US)

(73) Assignee: Rosemount Inc., Shakopee, MN (US)

( * ) Notice: Subject to any disclaimer, the term of this patent is extended or adjusted under 35 U.S.C. 154(b) by 303 days.

(21) Appl. No.: 18/337,220

(22) Filed: Jun. 19, 2023

(65) Prior Publication Data

US 2023/0417590 A1    Dec. 28, 2023

Related U.S. Application Data

(60) Provisional application No. 63/355,142, filed on Jun. 24, 2022.

(51) Int. Cl.
*G01F 23/284* (2006.01)
*H01Q 1/22* (2006.01)

(52) U.S. Cl.
CPC .......... *G01F 23/284* (2013.01); *H01Q 1/225* (2013.01)

(58) Field of Classification Search
CPC .............................. G01F 23/284; H01Q 1/225
See application file for complete search history.

(56) References Cited

U.S. PATENT DOCUMENTS

| | | | |
|---|---|---|---|
| 6,198,424 B1 | 3/2001 | Diede et al. | |
| 6,320,532 B1 | 11/2001 | Diede | |
| 6,477,474 B2 | 11/2002 | Diede | |
| 6,782,328 B2 | 8/2004 | Lovegren et al. | |
| 7,134,315 B1* | 11/2006 | Stigler | H01Q 1/225 73/290 R |
| 7,255,002 B2* | 8/2007 | Gravel | G01F 23/284 73/866.5 |
| 2006/0201265 A1* | 9/2006 | Klees | G01K 13/25 73/431 |
| 2009/0303106 A1* | 12/2009 | Edvardsson | G01S 7/03 342/124 |
| 2015/0330903 A1* | 11/2015 | Koerperick | G01N 21/359 435/288.7 |
| 2018/0094963 A1* | 4/2018 | Eriksson | G01F 23/284 |
| 2019/0219532 A1* | 7/2019 | Kashkoush | G01N 27/07 |
| 2020/0003603 A1* | 1/2020 | Uddh | G01S 13/08 |
| 2021/0318159 A1* | 10/2021 | Dieterle | G01F 23/284 |

OTHER PUBLICATIONS

International search report and written opinion for counterpart PCT application PCT/US2023/068670 dated Oct. 12, 2023, 11 pages.

* cited by examiner

*Primary Examiner* — Vladimir Magloire
*Assistant Examiner* — Nazra Nur Waheed
(74) *Attorney, Agent, or Firm* — Christopher R. Christenson; Kelly, Holt & Christenson, P.L.L.C.

(57) ABSTRACT

A guided-wave level measurement system for hygienic applications is provided. The system includes an electronics housing and system electronics disposed within the electronics housing and configured to generate a radar signal. A probe is coupled to the electronics and includes a waveguide configured to extend into a process vessel. A sheath is configured to receive the probe and extend into the process vessel.

18 Claims, 7 Drawing Sheets

HYGIENIC GUIDED WAVE LEVEL MEASUREMENT WITH SHEATH

CROSS-REFERENCE TO RELATED APPLICATIONS

The present application is based on and claims the benefit of U.S. Provisional Patent Application Ser. No. 63/355,142 filed Jun. 24, 2022; the content of which application is hereby incorporated by reference in its entirety.

BACKGROUND

Hygienic manufacturing processes are chemical or biological processes that require extreme cleanliness and purity. Examples of such processes include, without limitation, pharmaceutical and life science processes. In such applications, any breach or contamination of the processing environment may cause entire batches or quantities to be scrapped.

In such systems, re-usable components must often be subjected to extensive cleaning and/or sterilization between batches. Thus, not only must processing components be able to maintain the extremely clean environment, but they must also be able to withstand repeated cleaning cycles such as clean-in-place (CIP) and/or steam-in-place (SIP) processes.

When process fluid level is required for such hygienic applications, a differential pressure system is often used. In such systems, a pair of pressure ports are provided, where one pressure port is located near a bottom of a process vessel, such as a tank, and another pressure port is located at some location spaced above the lower pressure port. Each pressure port is provided with an isolation diaphragm against which the process fluid pressure bears. An opposite side of each isolation diaphragm is in contact with a fill fluid that conveys pressure from the movement of the isolation diaphragm to a differential pressure sensor. The differential pressure sensor is fluidically coupled to each of the pressure ports and provides a signal related to the difference in pressure between the two ports. This difference is directly related to the level of the process fluid in the vessel and can be used to provide a level indication.

Many hygienic processes rely on differential pressure-based level solutions in their hygienic process vessels. Differential pressure level instruments, however, have some potential disadvantages when operating in hygienic applications such as needing to be calibrated periodically, often as frequently as four times per year or more in hygienic manufacturing processes.

Guided wave level measurement is used in industrial processes. These devices generate radar waves and send them along a probe. When the radar wave encounters a change in fluid density (for example, at the boundary of air/liquid in a vessel) a reflection is returned along the waveguide. Electronics in the instrument detect the reflected signal and provide an indication of level. Radar instruments do not require calibration since they have no moving parts. Radar level solutions do not require any fill fluid, and thus do not experience potential drift due to heating of the vessel/instrument. Thus, hygienic processes with radar level measurement can begin another batch immediately after CIP/SIP procedures without concern for measurement drift, thereby increasing production capacity. Despite its many benefits, guided wave radar systems remain underutilized in hygienic manufacturing environments. This is believed to be due to the fact that guided wave radar solutions include one or more seams/crevices along the waveguide/probe, which makes hygienic compliance difficult.

SUMMARY

A guided-wave level measurement system for hygienic applications is provided. The system includes an electronics housing and system electronics disposed within the electronics housing and configured to generate a radar signal. A probe is coupled to the electronics and includes a waveguide configured to extend into a process vessel. A sheath is configured to receive the probe and extend into the process vessel.

DETAILED DESCRIPTION OF ILLUSTRATIVE EMBODIMENTS

In accordance with various aspects of the present description, a hygienic level sheath is used to integrate a non-hygienic guided wave radar level solution into a hygienic guided wave level application. In one example, the sheath integrates with a standard hygienic tri-clamp polytetrafluoroethylene (PTFE) o-ring/gasket to provide a long sleeve having a closed bottom. The radar waveguide/probe is then installed into the sheath to provide a hygienic radar level solution. This solution results in all-PTFE wetted parts and near maximum hygienic compliance when used with non-hygienic guided wave radar level solutions. Moreover, the sheath is inexpensive and easily replaceable and serviceable.

Figure 1:
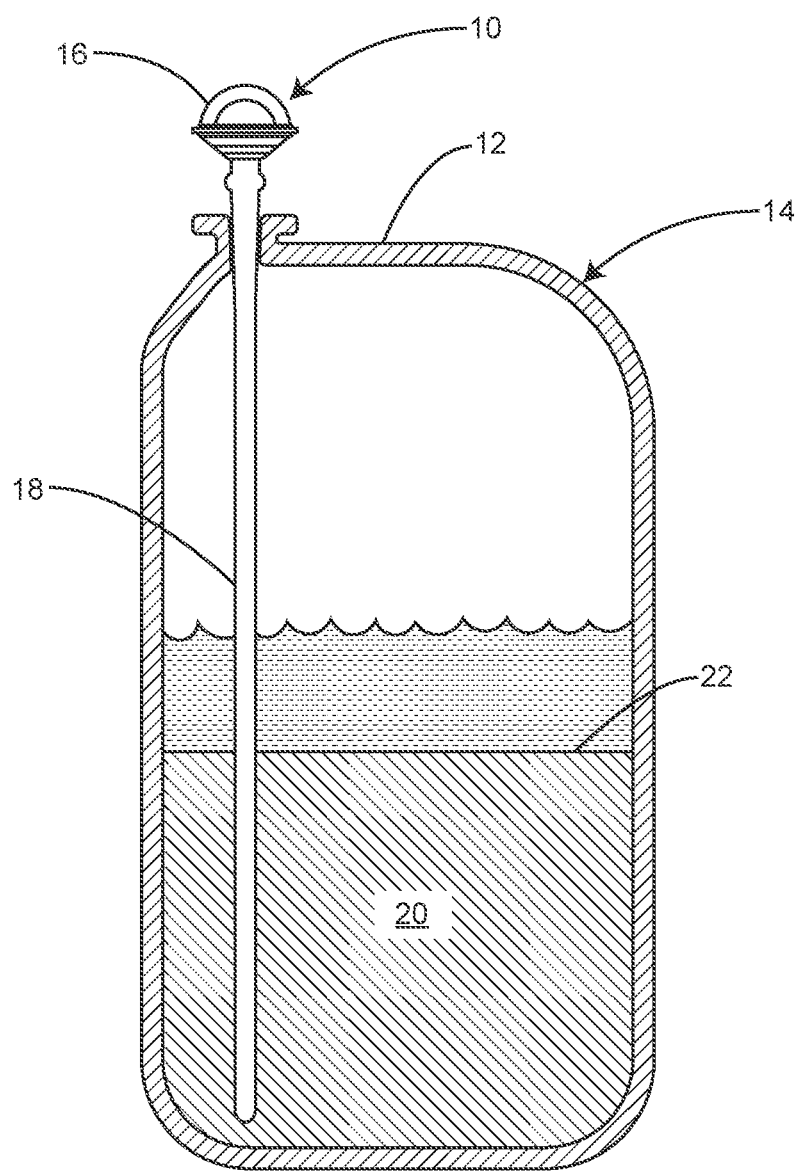
FIG. 1 is a diagrammatic view of a non-hygienic guided wave radar level instrument with which embodiments described herein are particularly useful.

FIG. 1 is a diagrammatic view of a non-hygienic guided wave radar level gauge or instrument with which embodiments described herein are particularly useful. As shown, guided-wave level measurement system 10 is generally mounted at or near a top surface 12 of a container or vessel 14. Guided-wave level measurement system includes an electronics housing 16 mounted to surface 12 external to container 14. A radar waveguide 18 is electrically coupled to electronics (not shown in FIG. 1) within housing 16 and extends downwardly into the interior of container 14. Low power, short duration (typically nano-second) microwave pulses are guided down probe 18 into the process media 20. When a microwave pulse reaches a medium with a different dielectric constant, part of the energy is reflected back to the electronics in electronics housing 16. The guided wave level measurement system uses the residual wave of the first reflection for measuring the interface level 22. Part of the wave, which was not reflected at the upper product surface, continues until it is reflected at the lower product surface. The speed of this wave depends on the dielectric constant of the upper product. The time difference between the transmitted and reflected pulse is converted into a distance, and the total level or interface level is then calculated. The reflection intensity depends on the dielectric constant of the process media: the higher the dielectric constant value, the stronger the reflection.

Figure 2:
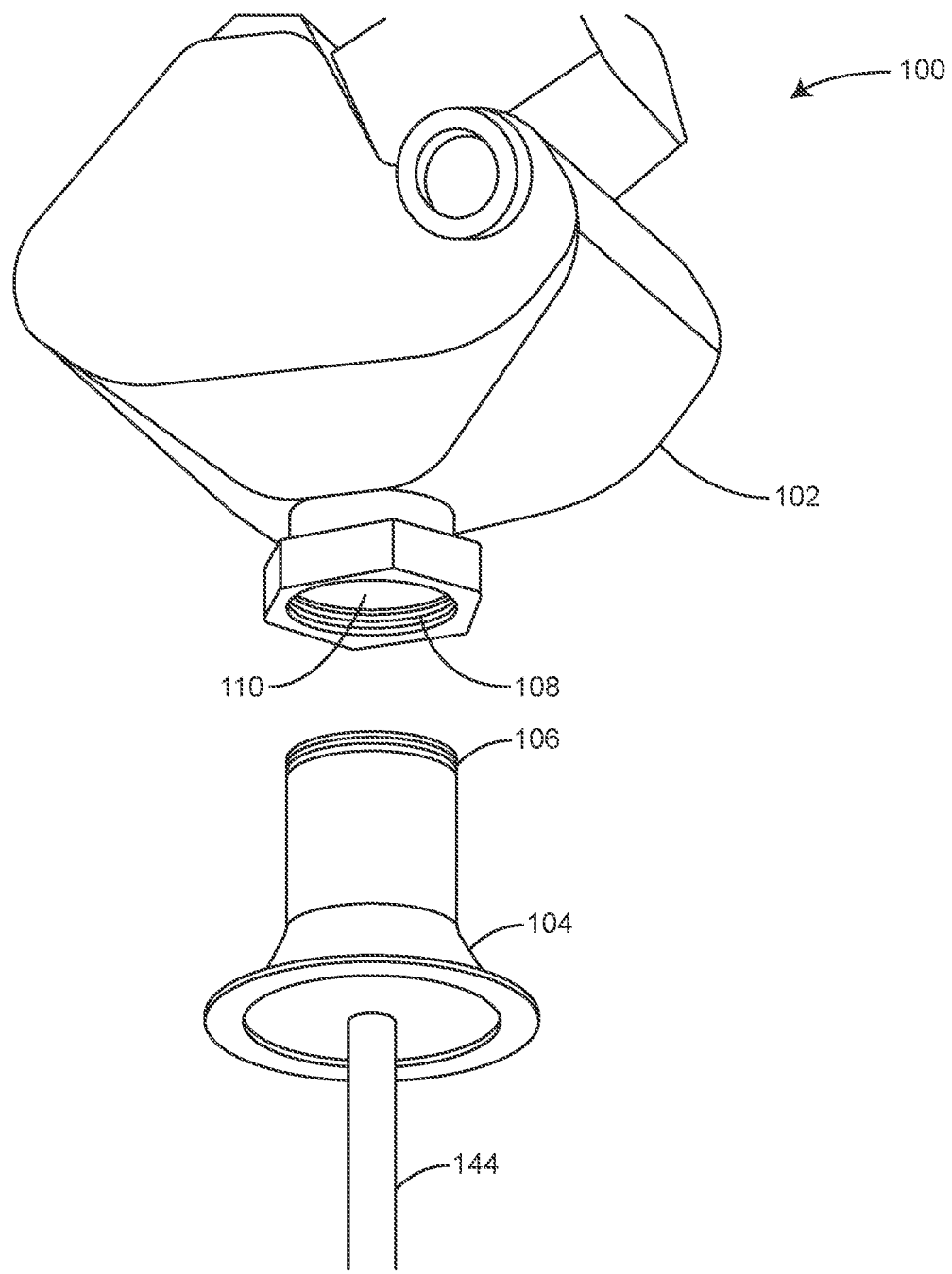
FIG. 2 is a diagrammatic view of a portion of a non-hygienic guided wave radar level instrument with which embodiments described herein are particularly useful.

FIG. 2 is a diagrammatic view of a non-hygienic guided wave radar level instrument with which embodiments described herein are particularly useful. Guided-Wave Radar (GWR) system 100 includes an electronics housing or head 102 (which may be the same as or different from housing 16 shown in FIG. 1) that is configured to couple to waveguide/probe 102 when threads 106 of probe 104 engage threads 108 of head 102. A single co-axial connector 110 of head 102 is configured to engage a corresponding connector in probe 104 to convey the signal generated by head 102 down probe 104 and into a process media.

Figure 3:
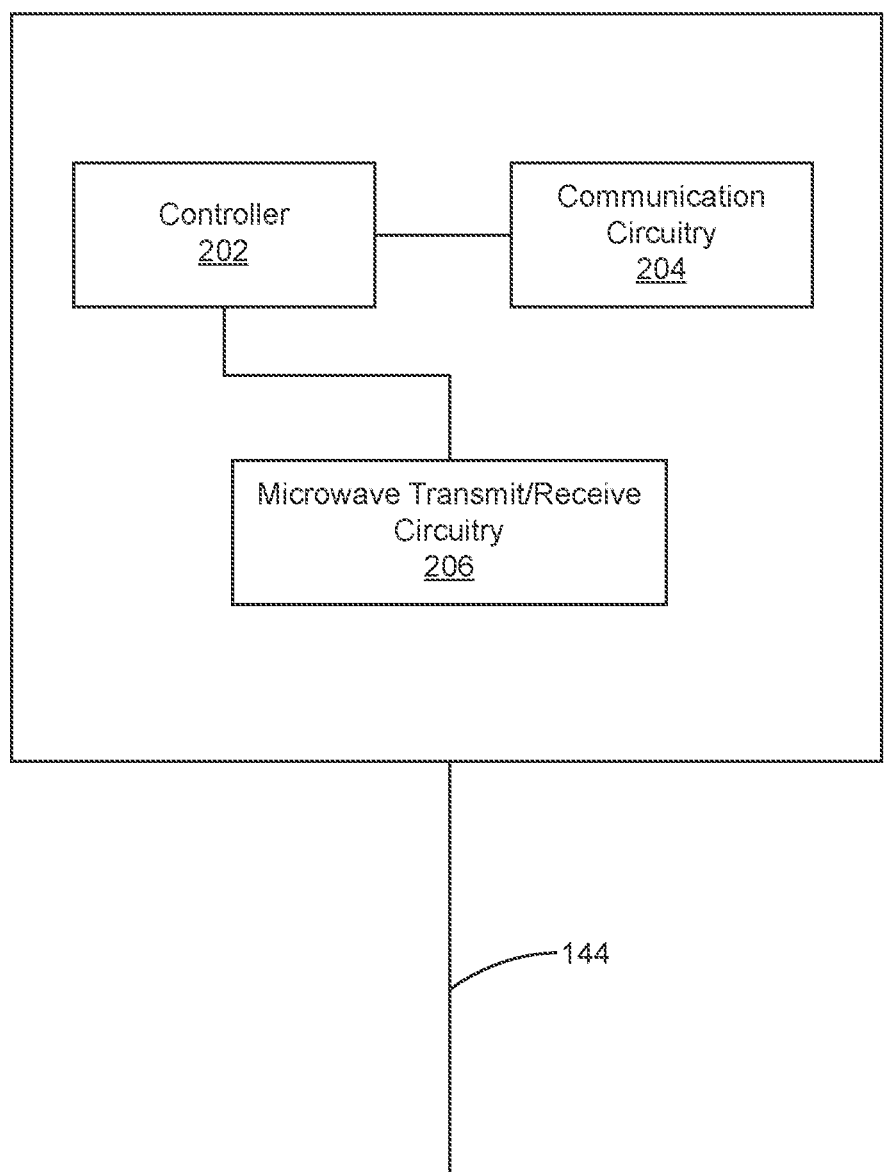
FIG. 3 is a block diagram of a non-hygienic guided wave radar level instrument.

FIG. 3 is a block diagram of a non-hygienic guided wave radar level instrument. Electronics 200 are disposed within electronics housing 102 (shown in FIG. 2) and include a controller 202, communication circuitry 204, and microwave transmit/receive circuitry 206. Transmit/receive circuitry 206 is configured to transmit and receive microwave frequency electromagnetic signals. Controller 202, which may be a microprocessor, is coupled to transmit/receive circuitry 206 for controlling transmit/receive circuitry 206 and for processing of signals received by transmit/receive circuitry 206 to determine the fill level of the process media in the container or vessel. Controller 202 is coupled to communication circuitry 204 in order to communicate the level information to one or more external devices. Although not shown in FIG. 3, the guided-wave radar level system is typically connected to an external power source or may be powered through communication lines coupled to communication circuitry 204. In some embodiments, the guided wave radar level measurement system is configured to communicate wirelessly.

Figure 4:
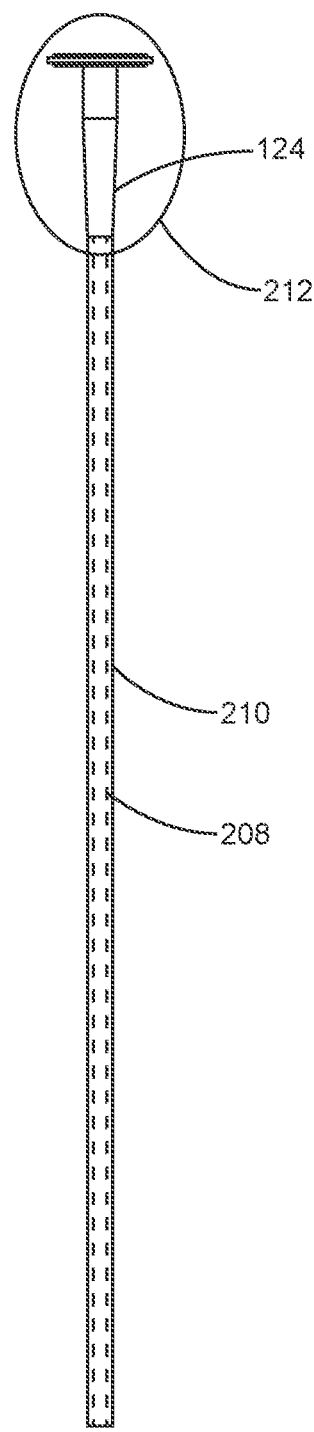
FIG. 4 is an elevation view of a sheath configured to receive a probe and allow the probe to be used in hygienic applications.

FIG. 4 is an elevation view of a sheath configured to receive a probe and allow the probe to be used in hygienic applications. As can be appreciated, the length of the waveguide is generally specified when the system is purchased and is selected based on the process media container to which the system will be attached. Accordingly, any sheath that is used in combination with such a waveguide must also be available in the same lengths. FIG. 4 shows a radar waveguide 208 disposed within a hygienic sheath 210. An upper portion 212 is configured to be mounted to a process vessel or container and, in the illustrated embodiment, includes a taper portion 124.

Figure 5:
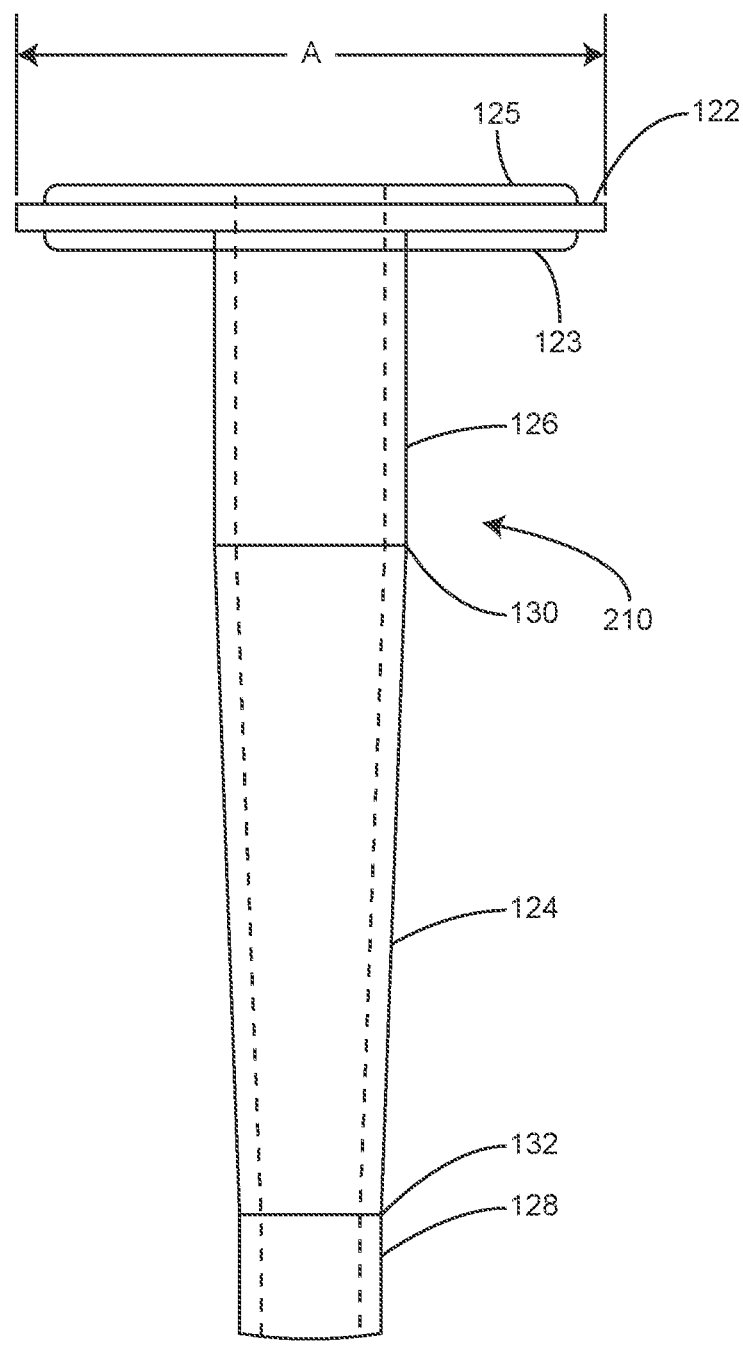
FIG. 5 is a diagrammatic elevation view of a portion of a sheath in accordance with an embodiment described herein.
Figure 6:
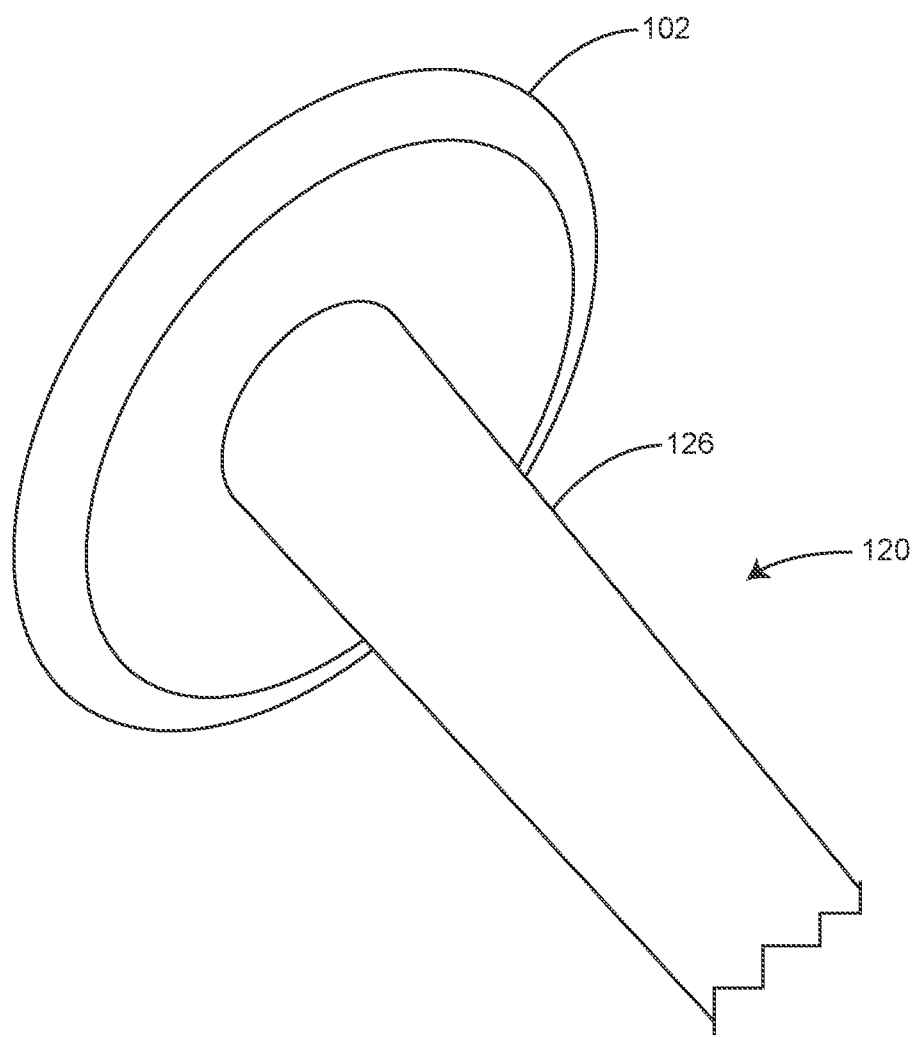
FIG. 6 is a diagrammatic perspective view of a portion of a sheath in accordance with an embodiment described herein.

FIGS. 5 and 6 are diagrammatic views of a portion of a hygienic sheath in accordance with an embodiment of the present invention. The view shown in FIG. 5. is an enlarged view of portion 212, shown in FIG. 4. While the following description may set forth some exemplary dimensions, such examples are provided merely for illustration and those or ordinary skill in the art will recognize that different sizes and configurations can be utilized in accordance with various embodiments described herein. Sheath 210 can be sized to accommodate different Triclamp sizes. For example, if a size 1.5 triclamp is used, the outer dimension "A" of flange portion 122 is about 50.5 millimeters. For a size 3 triclamp, dimension "A" is 91 millimeters. Thus, various sheaths 210 can be provided to accommodate applications having various size triclamps.

As shown in FIG. 5, a pair of annular projections 123, 125 extend away from flange portion 122. These annular projections form seals when with tank flange 142 (shown in FIG. 7) and probe 104 flange (shown in FIG. 2), respectively when clamped using a commercially-available Tri-Clamp or other suitable mechanical fastener.

Sheath 210 can be constructed of any suitable pharmaceutical grade resin that is United States Pharmacopeia (USP) Class VI compliant. In one particular example, sheath 210 is constructed of perfluoroalkoxy alkane, such as that sold under the trade designation, Chemours PFA 440 HP plastic that has been seamlessly welded and smoothed for sanitary service. Preferably, materials for sheath 210 are extruded from virgin resin without using any plasticizers or stabilizers in the process. The sheath is designed to not interfere with the signal sent along the probe so the probe still registers a change in fluid density (i.e., air/liquid boundary) with a reflection returned along the waveguide.

In one embodiment, sheath 210 includes taper portion 124 that extends from wider portion 126 to narrower portion 128. In the illustrated embodiment, taper portion 124 has a length of about 50.8 millimeters. Taper portion 124 couples to wider portion 126 at location 130, where the inside diameter of sheath 122 is about 12.7 millimeters. Taper portion 124 couples to narrower portion 128 at location 132 where the inside diameter is about 8.1 millimeters. Taper portion 124 is shown with a gradual change to the inside diameter between locations 130 and 132. Taper portion 124 is important for a feature called sprayball protection.

Figure 7:
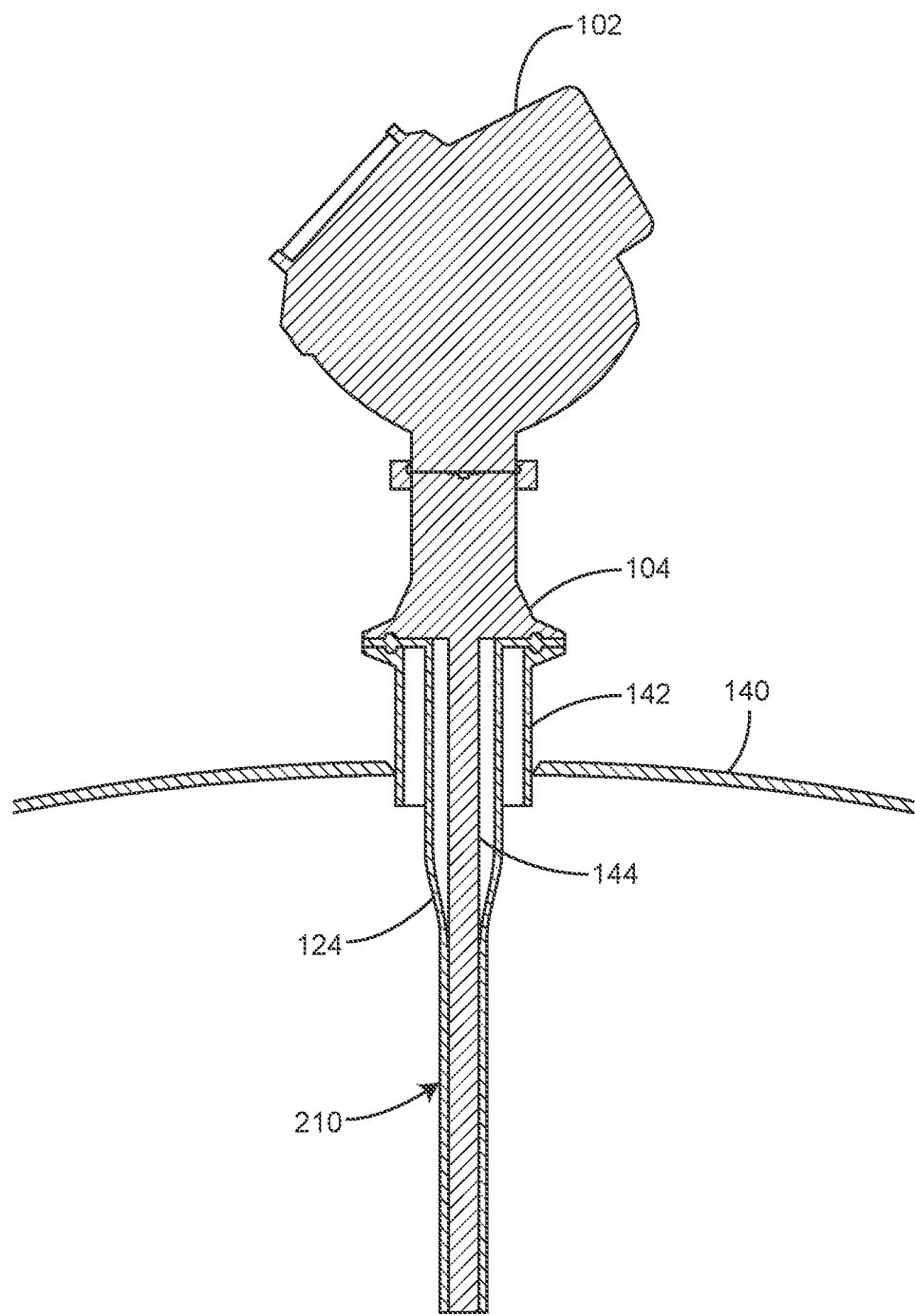
FIG. 7 is a diagrammatic view of a hygienic guided wave radar level measurement system in accordance with one embodiment.

FIG. 7 is a diagrammatic view of a hygienic guided wave radar level measurement system in accordance with one embodiment. As shown, probe 104 is coupled to head 102 and the assembly is mounted to a tank wall using a tank flange 142. Waveguide 144 of probe 104 extends into the tank within sheath 210. FIG. 7 shows taper portion 124 near the top of sheath 210. A potential challenge for guided wave radar in hygienic applications is the necessity for sprayball washdowns of the vessel between batches. The sprayballs are exactly as they sound—round stainless-steel spheres with precise orifices drilled around their outside surface which direct water through such orifices toward all internal features and/or surfaces the hygienic process vessel. This results in the top of the radar probe enduring several streams of water sprayed directly at it from multiple directions between each batch. This can result in false high-level readings that can force the process into a fault state. This can be a significant issue for end users. The sprayball protection area is where the diameter of sheath 210 increases at taper portion 124 just before it attaches to the gasket at the top of sheath 210. In some examples, the length of taper portion 124 may be increased or decreased, as desired. Taper portion 124 provides sprayball protection by providing an increased distance between waveguide 144 and sheath 122 (i.e., air gap) such that even if multiple streams from the sprayball impact the sprayball protection area, false high-level readings or interference will not result.

Although the present invention has been described with reference to preferred embodiments, workers skilled in the art will recognize that changes may be made in form and detail without departing from the spirit and scope of the invention.

What is claimed is:

1. A guided-wave level measurement system for hygienic application, the system comprising:

an electronics housing;

system electronics disposed within the electronics housing and configured to generate a radar signal;

a probe coupled to the electronics, the probe having a waveguide configured to extend into a process vessel; and a sheath configured to receive the probe and extend into the process vessel, wherein the sheath includes a taper portion adjacent to an upper portion of the probe, the taper portion providing sprayball protection by providing a gap between the waveguide and the sheath.

2. The system of claim 1, wherein the sheath is constructed from a pharmaceutical grade resin.

3. The system of claim 1, wherein the sheath is constructed from a material that is United States Pharmacopeia (USP) Class VI compliant.

4. The system of claim 1, wherein the sheath is constructed from perfluoroalkoxy alkane.

5. The system of claim 1, wherein the sheath is seamlessly welded.

6. The system of claim 1, wherein the sheath is smoothed for sanitary service.

7. The system of claim 1, wherein the sheath is extruded from virgin resin.

8. The system of claim 1, wherein an internal diameter of the taper portion changes gradually between a wider portion and a narrower portion.

9. The system of claim 1, wherein a wider portion of the taper is configured to be positioned closer to a mounting flange of the process vessel than a narrower portion of the taper.

10. The system of claim 1, wherein the system electronics include:

microwave transmission and reception circuitry operably coupled to the waveguide and configured to launch a pulse of microwave energy down the waveguide and detect one or more reflections received on the waveguide;

a controller coupled to the microwave transmission and reception circuitry and configured to control the microwave transmission and reception circuitry and to detect a time difference between a pulse launch and reception of one or more reflected pulses, the controller being configured to determine interface level based on the time difference; and communication circuitry coupled to the controller, the communication circuitry being configured to receive process media level information from the controller and communicate the process media level information to a remote device.

11. The system of claim 10, wherein the controller is a microprocessor.

12. The system of claim 10, wherein the communication circuitry is configured to communicate wirelessly.

13. The system of claim 1, wherein the sheath includes a flange portion configured to mate with a tank flange.

14. The system of claim 13, and further comprising an annular projection extending from the flange portion, the annular projection being configured to seal with the tank flange.

15. The system of claim 14, and further comprising a second annular projection disposed on an opposite side of the flange portion and extending away from the flange portion.

16. The system of claim 1, wherein the system electronics are configured to be powered through communication lines coupled to communication circuitry of the system electronics.

17. The system of claim 1, wherein the gap is an air gap.

18. The system of claim 1, wherein the gap is between an inner diameter of a wider portion of the taper portion and an outer diameter of the waveguide.

* * * * *